US008564818B2

(12) United States Patent
Nakamura

(10) Patent No.: US 8,564,818 B2
(45) Date of Patent: Oct. 22, 2013

(54) LOG INFORMATION MANAGEMENT SYSTEM, CONTROL METHOD THEREFOR, AND STORAGE MEDIUM

(75) Inventor: Tadahiro Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 12/967,532

(22) Filed: Dec. 14, 2010

(65) Prior Publication Data

US 2011/0149344 A1 Jun. 23, 2011

(30) Foreign Application Priority Data

Dec. 18, 2009 (JP) ................................ 2009-288465

(51) Int. Cl.

| | |
|---|---|
| ***G06K 15/00*** | (2006.01) |
| ***G06F 3/12*** | (2006.01) |
| ***G06F 7/00*** | (2006.01) |
| ***G06F 17/00*** | (2006.01) |
| ***H04N 1/00*** | (2006.01) |

(52) U.S. Cl.
USPC ........ 358/1.15; 358/1.14; 358/1.16; 358/402; 358/405; 707/600; 707/672

(58) Field of Classification Search
USPC ......... 358/1.15; 707/600, 602, 607, 627, 636, 707/662, 666, 668, 672, 696, 706, 707, 711, 707/758, 821, 855, 828, 830, 667, 836; 348/1.15, 1.13, 1.14, 1.16, 405, 402, 348/439, 476, 426.05; 709/201, 212, 217, 709/227, 238
See application file for complete search history.

(56) References Cited

U.S. PATENT DOCUMENTS

| | | | | |
|---|---|---|---|---|
| 2004/0246512 | A1* | 12/2004 | Miyamoto | 358/1.13 |
| 2008/0016506 | A1* | 1/2008 | Okabe | 718/100 |
| 2008/0140675 | A1* | 6/2008 | Saito | 707/10 |
| 2010/0333116 | A1* | 12/2010 | Prahlad et al. | 719/328 |

FOREIGN PATENT DOCUMENTS

| | | |
|---|---|---|
| JP | 2004-40630 A1 | 2/2004 |

* cited by examiner

*Primary Examiner* — Benny Tieu
*Assistant Examiner* — Ngon Nguyen
(74) *Attorney, Agent, or Firm* — Carter, DeLuca, Farrell & Schmidt, LLP

(57) ABSTRACT

An image forming apparatus transmits a log notification request to a server before log transmission. The server responds to the image forming apparatus by appropriately performing scheduling of a log transmission time to disperse a load. The image forming apparatus transmits a log at a time designated by the server.

8 Claims, 24 Drawing Sheets

| ID | JOB TYPE | USER NAME | JOB NAME | EXECUTION TIME | RESULT | IMAGE ID |
|---|---|---|---|---|---|---|
| 1000 | COPY | User1 | Copy Job | 2009/9/1 10:00 | OK | 1 |
| 1001 | PRINT | Administrator | aaa.doc | 2009/9/1 11:00 | OK | 2 |
| 1002 | PRINT | Guest | bbb.doc | 2009/9/1 15:00 | NG | -1 |
| | | | | | | |
| ⋮ | ⋮ | ⋮ | ⋮ | ⋮ | ⋮ | ⋮ |
| | | | | | | |

509 510 511

| IMAGE ID | FILE NAME |
|---|---|
| 1 | aaa.jpg |
| 2 | bbb.jpg |
| | |
| ⋮ | ⋮ |
| | |

| LOG TRANSMISSION TIME | RECEIPT NUMBER | DEVICE ID |
|---|---|---|
| 22:00 | 1000 | DEV00001 |
| | 1049 | DEV12345 |
| | | |
| 22:10 | 1001 | DEV00555 |
| | | |
| | | |
| ⋮ | ⋮ | ⋮ |
| 6:00 | 1048 | DEV98765 |
| | | |
| | | |

FIG.16

```
<NotifyLogInformationRequest>
  <Device>
    <DeviceId>DEV00001</DeviceId>
    <Model>Canon iRXXXX</Model>
    <HddLeft>1.2GB </HddLeft>
  </Device>
  <Log>
    <JobType>copy</JobType>
    <User>user1</User>
    <Priority>1</Priority>
    <Size>10MB</Size>
  </Log>
</NotifyLogInformation>
```

```
<NotifyLogInformationResponse>
  <SendNow>true</SendNow>
  <LogId>1000</LogId>
  <LogSendTime></LogSendTime>
  <Expire></Expire>
</NotifyLogInformationResponse>
```

FIG.17B

```
<NotifyLogInformationResponse>
  <SendNow>false</SendNow>
  <LogId>1000</LogId>
  <LogSendTime>24:00</LogSendTime>
  <Expire>6:00</Expire>
</NotifyLogInformationResponse>
```

FIG.19

```
<NotifyLogInformationRequest>
  <Device>
    <DeviceId>DEV00001</DeviceId>
    <Model>Canon iRXXXX</Model>
    <Power>10KWh</Power>
  </Device>
  <Log>
    <JobType>copy</JobType>
  </Log>
</NotifyLogInformation>
```

| LOG TRANSMISSION TIME | TOTAL POWER CONSUMPTION | RECEIPT NUMBER | DEVICE ID |
|---|---|---|---|
| 22:00 | 20KWh | 1000 | DEV00001 |
| | | 1049 | DEV12345 |
| | | | |
| 22:10 | 10KWh | 1001 | DEV00555 |
| | | | |
| | | | |
| ⋮ | ⋮ | ⋮ | ⋮ |
| 6:00 | 5KWh | 1048 | DEV98765 |
| | | | |
| | | | |

FIG.22

```
<NotifyLogInformationRequest>
  <Device>
    <DeviceId>DEV00001</DeviceId>
    <Model>Canon iRXXXX</Model>
  </Device>
  <Log>
    <JobType>copy</JobType>
    <LogSize>100MB</LogSize>
  </Log>
</NotifyLogInformation>
```

| LOG TRANSMISSION TIME | LOG SIZE | RECEIPT NUMBER | DEVICE ID |
|---|---|---|---|
| 22:00 | 250MB | 1000 | DEV00001 |
| | | 1049 | DEV12345 |
| | | | |
| 22:10 | 300MB | 1001 | DEV00555 |
| | | | |
| | | | |
| ⋮ | ⋮ | ⋮ | ⋮ |
| 6:00 | 100MB | 1048 | DEV98765 |
| | | | |
| | | | |

LOG INFORMATION MANAGEMENT SYSTEM, CONTROL METHOD THEREFOR, AND STORAGE MEDIUM

BACKGROUND OF THE INVENTION

1. Field of the Invention

The present invention relates to a log information management system for transmitting log information generated at an image forming apparatus to a server and managing the log information on the server, a control method therefor, and a storage medium.

2. Description of the Related Art

Hitherto, a log information management system has been utilized, which transmits log information generated at an image forming apparatus such as a digital copying machine and a printer to a server and manages logs on the server. With development of techniques for speeding up networks and of network security techniques, a server can be placed not on an intranet but on the Internet. In recent years, a service called a "cloud" has emerged, which enables utilizing computer resources on a large-scale datacenter connected to each server by necessary amounts. A server for managing logs can be placed on the cloud. Use of the cloud has various merits in eliminating needs for management of hardware and in easily adding resources according to a server load. On the other hand, types of log information to manage are diversified. A first type of log information is a job log. The job log is information concerning jobs, such as copy jobs, facsimile (FAX) jobs, and print jobs, performed by users, which is retained in an image forming apparatus. Servers can manage information concerning which of users performs jobs, how many jobs are performed, and the like by collecting job logs. A second type of log information is a device log. The device log is used to notify servers of various types of errors, e.g., remaining-amounts of consumables such as toner, and jams, at occurrence thereof, and to facilitate servicemen to take necessary countermeasures. A third type of log information is an image log. In recent years, image log checking systems have existed, which transmit, as image logs, image data that is, e.g., printed by image forming apparatuses and sent by FAXs. In such systems, the image logs transmitted to the servers can be checked visually and later by checkers. Checkers can check, e.g., whether any classified document is printed or transmitted to the outside.

Among the various types of logs cited above, the image logs are overwhelmingly large in log-size. The image log checking system cannot ignore traffic loads imposed on a communication network in addition to processing loads imposed on servers that receive logs. When the loads imposed on the network increases, communication efficiency of the entire network decreases. Sometimes, users' operations are adversely affected. Thus, the above image log checking system is enabled to set, as a time at which the image forming apparatus transmits an image log to a server, a night-time in which users don't use the network.

In a log information management system configured so that each image forming apparatus transmits log information to a server, a timing should be set, at which each image forming apparatus transmits log information to the server. Japanese Patent Application Laid-Open No. 2004-40630 discusses a technique in which usually, an image forming apparatus periodically transmits log information to a server and in which the server temporarily changes a log transmission interval by notifying the image forming apparatus of an interval at which the image forming apparatus transmits the next log information, as a response. Consequently, the server can designate, at a timing at which the image forming apparatus transmits a log, a timing of transmitting the next log.

In order to prevent an increase in a daytime network load, a night-time is often set as an image log transmission time by the log information management system for managing image logs on servers, as described above. However, when the number of image forming apparatuses to be managed is increased to hundreds or thousands, the problems of each server's processing load and a network processing load arise again. For example, if thousands of image forming apparatuses concurrently perform log transmissions at a specific time in a night, an associated-server's processing load drastically increases at the specific time. Many log transmissions fail. Retransmission of failed log transmissions is repeated. Accordingly, time taken to complete all log transmissions is increased. Thus, a situation may occur, in which the log transmissions are not completed until morning at which a user' s operation is started. In addition, an image forming apparatus having to be in an electric-power saving state except during each log transmission should be in a normal state in order to repeat the retransmission of the log. Consequently, a problem of wasted power consumption occurs.

The technique discussed in Japanese Patent Application Laid-Open No. 2004-40630 is based on a premise that an image forming apparatus periodically transmits a log to a server. Accordingly, the technique discussed therein cannot be applied to a case that an image forming apparatus transmits a log only when the log is generated.

SUMMARY OF THE INVENTION

According to an aspect of the present invention, a log information management system includes an image forming apparatus for transmitting, via a network, log information stored therein, and an information processing apparatus for receiving the log information from the image forming apparatus and managing the received log information. The image forming apparatus includes a log notification transmitting unit configured to notify the information processing apparatus that the image forming apparatus stores a log, to receive from the information processing apparatus a response against the notification, to extract a log transmission time from the received response and to set the log transmission time, and a log transmission unit configured to transmit the log to the information processing apparatus at the set log transmission time. The information processing apparatus includes a log notification receiving unit configured to receive the notification from the image forming apparatus and to transmit the response to the log notification transmitting unit, and a log transmission time determination unit configured to determine the log transmission time at which the image forming apparatus transmits the log.

The present invention can provide a log information management system in which even when the number of image forming apparatuses to be managed is increased, a server appropriately performs log transmission scheduling to optimize a communication load imposed on a network and efficiently transmit log information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates examples of logs generated by the image forming apparatus.

FIG. 12 illustrates an example of a log transmission schedule table generated by the server.

FIG. 16 illustrates an example of a log notification request transmitted by the image forming apparatus.

FIGS. 17A and 17B respectively illustrate examples of a log notification response transmitted by the server.

FIG. 19 illustrates an example of a log notification request transmitted by the image forming apparatus.

FIG. 20 is a diagram illustrating an example of the log transmission schedule table generated by the server.

FIG. 22 illustrates an example of the log notification request transmitted by the image forming apparatus.

FIG. 23 illustrates an example of the log transmission schedule table generated by the server.

DESCRIPTION OF THE EMBODIMENTS

Figure 1:
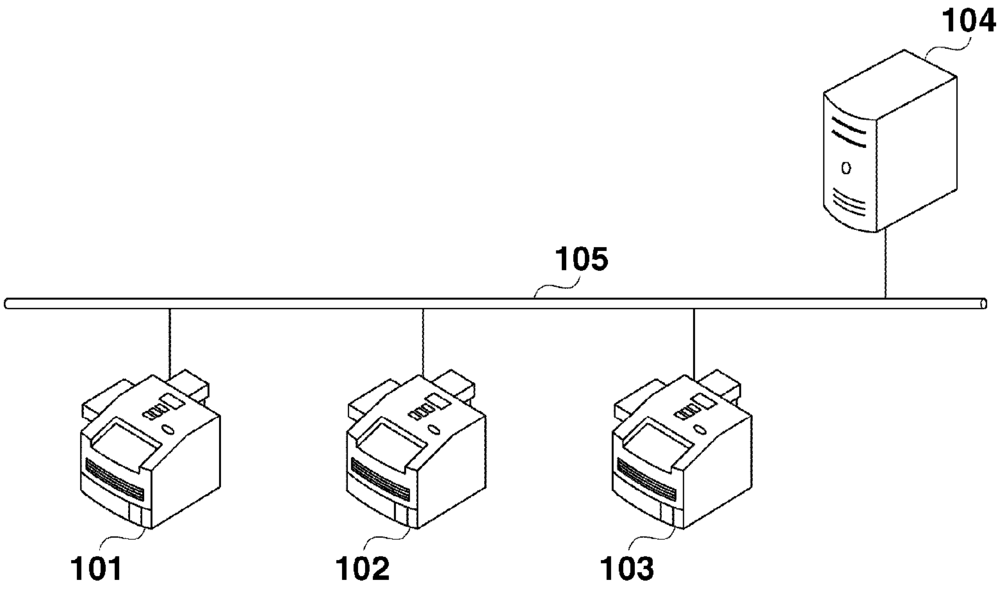
FIG. 1 illustrates a system configuration of a log information management system to which the present invention is applied.

Various exemplary embodiments, features, and aspects of the invention will be described in detail below with reference to the drawings.

In the following description, unless otherwise noted regarding reference numerals, common or similar components are designated by common reference numerals. Thus, duplicate descriptions of such components are omitted.

FIG. 1 illustrates a system configuration of a log information management system according to a first exemplary embodiment of the present invention. As illustrated in FIG. 1, image forming apparatuses 101, 102, and 103 are connected to one another communicatably with one another via a server 104 and a network 105. A larger number of image forming apparatuses can be connected to one another. A large-scale environment can be constructed, in which hundreds or thousands of image forming apparatuses are connected to one another. In the following description, one reference numeral 101 is used as a single representative reference numeral designating image forming apparatuses. The server 104 can be placed on an intranet, the Internet via a firewall, or a cloud.

The image forming apparatus 101 has functions of performing various jobs involving image processing, such as copy jobs, FAX jobs, and print jobs, and can store results of performing jobs as log information and transmit the log information to the server 104 at a predetermined timing. Logs handled in the present embodiment are assumed to be of two types, i.e., job logs and image logs.

The server 104 receives various logs from the image forming apparatus 101 and stores the received logs. When receiving an image log, the server 104 stores the image log in a database after extracting text information by performing optical character recognition (OCR) processing, and after converting an image format to reduce an image size. The image log is stored by being associated with a job log. A log can be retrieved using an extracted keyword. As illustrated in FIG. 1, the server 104 is configured to perform image conversion processing and image retrieval processing. However, the system can be configured so that such processing is performed by another server.

Figure 2:
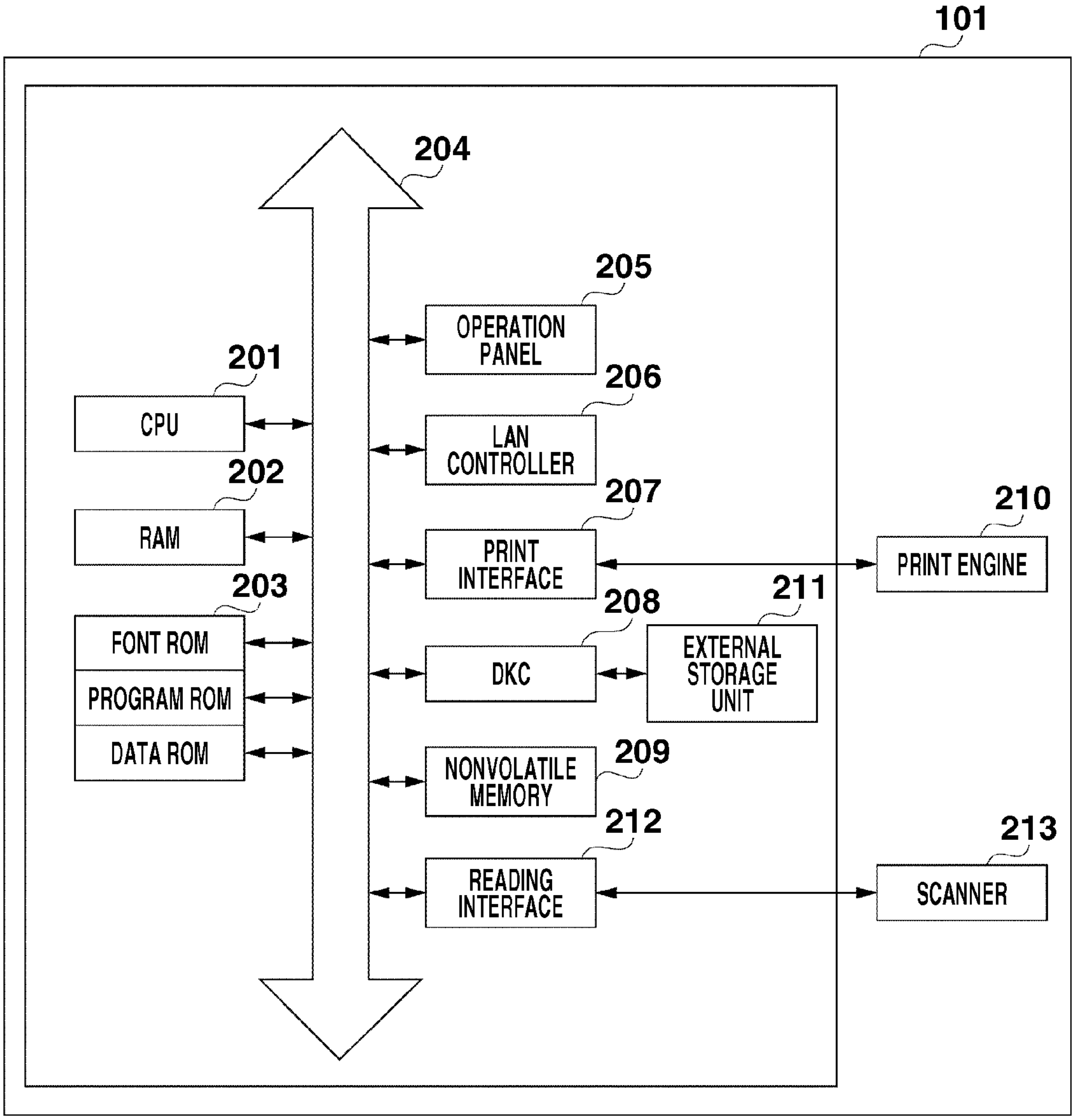
FIG. 2 is a block diagram illustrating a hardware configuration of an image forming apparatus.

FIG. 2 is a block diagram illustrating a hardware configuration of the image forming apparatus 101. Hereinafter, a copying machine is described as an example of the image forming apparatus 101. In the image forming apparatus 101 illustrated in FIG. 2, a central processing unit (CPU) 201 administratively controls, based on a control program stored in a program read-only memory (ROM) of a ROM 203 or in an external storage unit 211, accesses to each of various devices connected to a system bus 204. The CPU 211 outputs image signals to a printing unit (print engine) 210 connected via a print interface 207 thereto as output information. The CPU 211 also controls image signals input from a reading unit (scanner) 213 connected thereto via a reading interface 212. A control program executable by the CPU 201 is stored in the program ROM of the ROM 203. In addition, font data (including outline font data) or the like used when the output information is generated is stored in a font ROM of the ROM 203. Information or the like utilized on a host computer is stored in a data ROM of the ROM 203. The CPU 201 can perform a process of communicating with the host computer and the image forming apparatus on the network via a local area network (LAN) controller unit 206. A random access memory (RAM) 202 functions mainly as a main memory, a work area, or the like and is configured such that memory capacity thereof can be expanded by an optional RAM connected to an expansion port (not shown). The RAM 202 is used as an output information development area, an environment data storage area, or the like. A disk controller (DKC) 208 controls accesses to an external storage unit 211, such as a hard disk drive (HDD), and an integrated circuit (IC) card. A hard disk stores application programs, font data, form data, and the like, and is used as a job storage region for temporarily spooling print jobs and controlling the spooled jobs from outside. In addition, the hard disk is also used as a BOX data storage region to store image data read from the scanner 213 and that of a print job as BOX data and to refer to the image data on a network and print the image data. According to the present embodiment, the HDD is used as the external storage unit and stores various logs such as job logs and image logs. An operation panel 205 is configured such that users can input from software keys various information. The number of the above external storage units is not limited to one. The image forming apparatus 101 can have at least one or more of the external storage units and can be configured so that an optional font card to supplement built-in fonts and a plurality of external memories storing programs for interpreting printer control languages of different language systems are connected to the DKC 208. A nonvolatile memory 209 stores various setting information to be set from the operation panel 205.

In addition, various expansion devices (not shown), such as a finisher which provides stapling and sorting functions and a duplex printing device for implementing a duplex printing function, can optionally be attached to the image forming apparatus 101. Operations of such expansion devices are controlled from the CPU 201.

Figure 3:
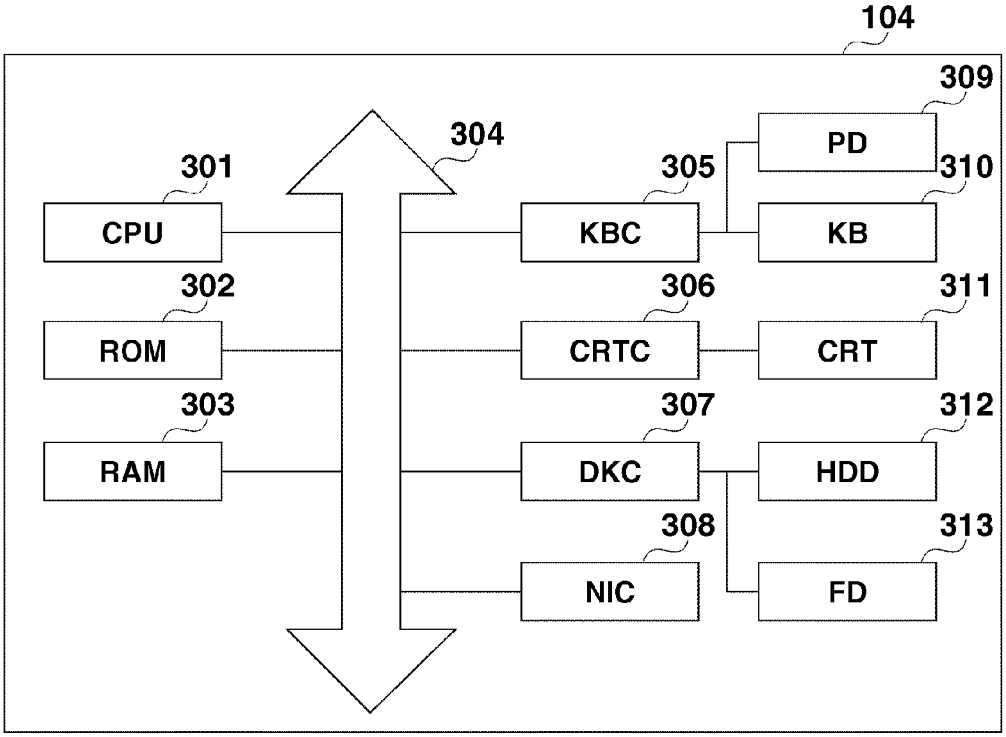
FIG. 3 is a block diagram illustrating a hardware configuration of a server.

FIG. 3 is a block diagram illustrating a hardware configuration of the server 104. A CPU 301 illustrated in FIG. 3 controls various devices connected to a system bus 304. A ROM 302 stores a basic input/output system (BIOS) and a boot program. A RAM 303 is used as a main memory device of the CPU 501. A keyboard controller (KBC) 305 performs processing associated with inputting of information or the like from a pointing device 309, such as a mouse (registered trademark), and a keyboard 310. A display control unit (cathode ray tube controller (CRTC)) 306 contains an internal video memory. The display control unit 306 writes, according to an instruction from the CPU 301, image data in the video memory and outputs the image data written in the video memory to a CRT display unit 311 as video signals. FIG. 3 illustrates a CRT as an example of the display unit 311. Alternatively, another type of a display device such as a liquid crystal display device can be used. A disk controller (DKC) 307 accesses a hard disk drive (HDD) 312 and a floppy (registered trademark) disk 313. A network interface card (NIC) 308 is connected to a network and performs information communication therewith via the network. The HDD 312 stores an operating system (OS), various application programs running on the OS, and the like. In the above configuration, when a power supply for the present apparatus is turned on, the CPU 301 reads the OS from the HDD 312 to the RAM 303 according to the boot program stored in the ROM 302, and functions as an information processing apparatus.

Figure 4:
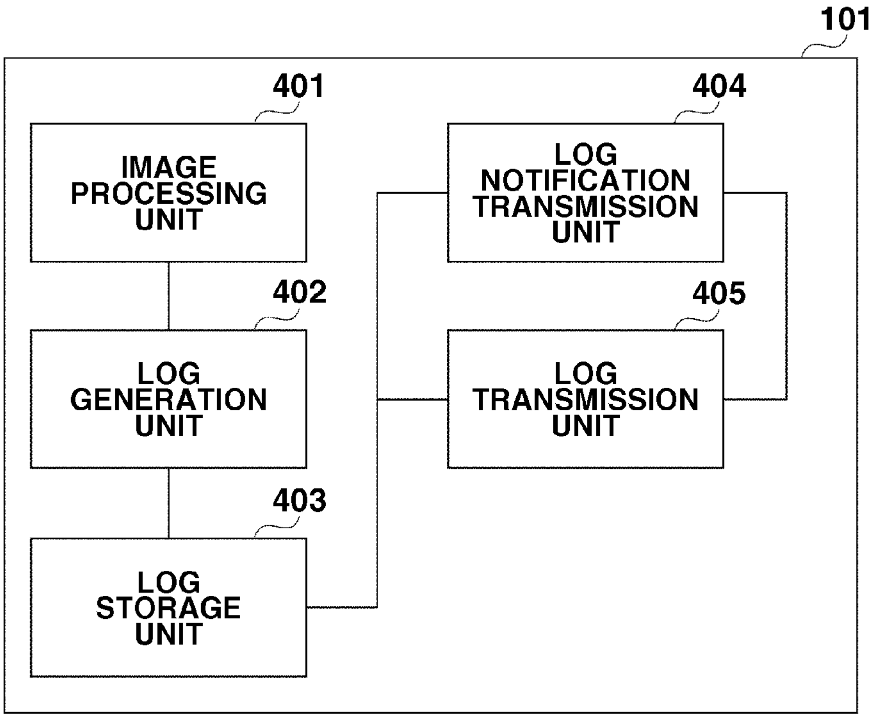
FIG. 4 is a block diagram illustrating a software configuration of the image forming apparatus.

FIG. 4 is a block diagram illustrating a software configuration of the image forming apparatus 101. An image processing unit 401 performs various jobs involving image processing, such as copy jobs, FAX jobs, and print jobs. A log generation unit 402 collects various information concerning jobs, such as image data processed by the image processing unit 401 and a user name corresponding to each job, and an execution time of each job, and generates a log, as illustrated in FIG. 5. A log storage unit 403 stores the generated log. At a predetermined timing, a log notification transmission unit 404 notifies the server 104 that the log storage unit 403 stores a log to send. The log notification transmission unit 404 receives log transmission time information as a response from the server 104. A log transmission unit 405 stores the log transmission time information received from the server 104. The log transmission unit 405 sends the log stored in the log storage unit 403 to the server 104 at a log transmission time represented by the log transmission time information stored therein.

FIG. 5 illustrates an example of a log generated by the image forming apparatus 101. In a job log table 501, an ID 502 identifies a job log and has a non-duplicate value corresponding to each image forming apparatus. A job type 503 represents a type of a job and includes a copy job, a FAX job, a print job, and the like. A user name 504 is a name of a user executing a job. A job name 505 represents a name of a job. If the job type 503 is a print type, the job name 505 is a name of a print file. If the job type 503 is a copy type or a FAX type, the job name 505 is a "Copy Job" or a "FAX Job". An execution time 506 represents a time at which a job is executed. A result 507 represents a result of executing a job. Thus, the result 507 indicates "OK" or "NG". An image ID 508 represents an ID of image data. If the image data is not retained as a log, the image ID 508 has a value of "−1".

Each image log includes an image data management table 509 and image data itself. An image ID 510 is referred to from the image ID 508. A file name 509 represents a name of a file of image data stored in the HDD 211. Image data is stored in the HDD 211 by a name identified in a field of the file name 509.

Figure 6:
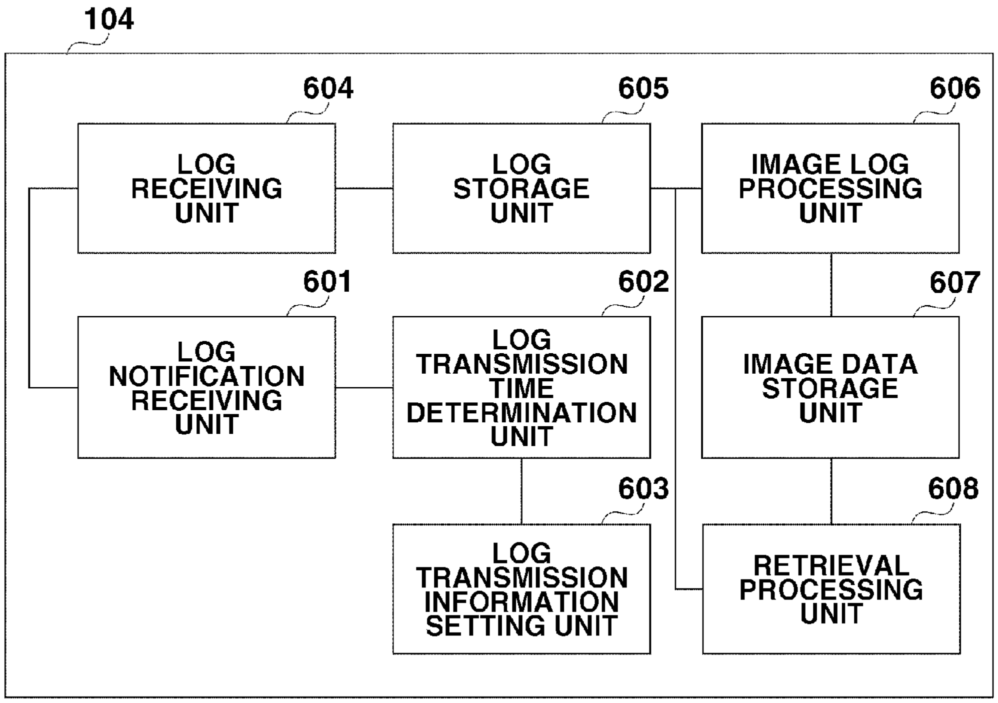
FIG. 6 is a block diagram illustrating a software configuration of the server.

FIG. 6 is a block diagram illustrating a software configuration of the server 104. A log notification receiving unit 601 receives a log notification request transmitted from the image forming apparatus 101. When receiving a log notification request sent from the image forming apparatus 101, a log transmission time determination unit 602 determines, from a log transmission time zone and a scheduling interval set by the log transmission information setting unit 603, a time at which the image forming apparatus 101 can send a log. A log receiving unit 604 receives a log from the image forming apparatus 101. A log storage unit 605 stores the received log. An image log processing unit 606 acquires image data stored in the log storage unit 605 and performs image processing such as OCR and format conversion. An image data storage unit 607 stores image data obtained by the conversion. A retrieval processing unit 608 performs retrieval of a log, based on log information stored in the log storage unit 605, in response to a retrieval request from a user.

Figure 7:
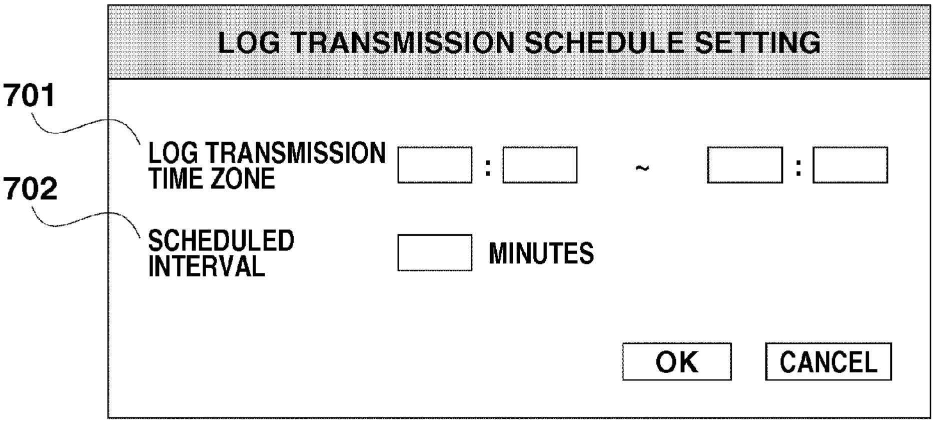
FIG. 7 illustrates a user interface (UI) of a log transmission information setting unit of the server.

FIG. 7 is a diagram illustrating a UI of a log transmission information setting unit 603 of the server 104. This UI is configured as a Web application. Each setting data can remotely be input using a Web browser. Alternatively, the server 104 can be configured so that the UI is displayed on the CRT display unit 311, and that each setting data is input from the pointing device 309, the keyboard 310, or the like.

A log transmission time zone 701 is a time zone in which the image forming apparatus 101 performs log transmission. A scheduling interval 702 is a time interval for dispersing the transmission time in the above time zone. If it is set that the log transmission time zone ranges from 22:00 to 6:00, and that the interval is set at 10 minutes, log transmission is performed at 22:00, 22:10, 22:20 . . . 5:50, and 6:00.

Figure 8:
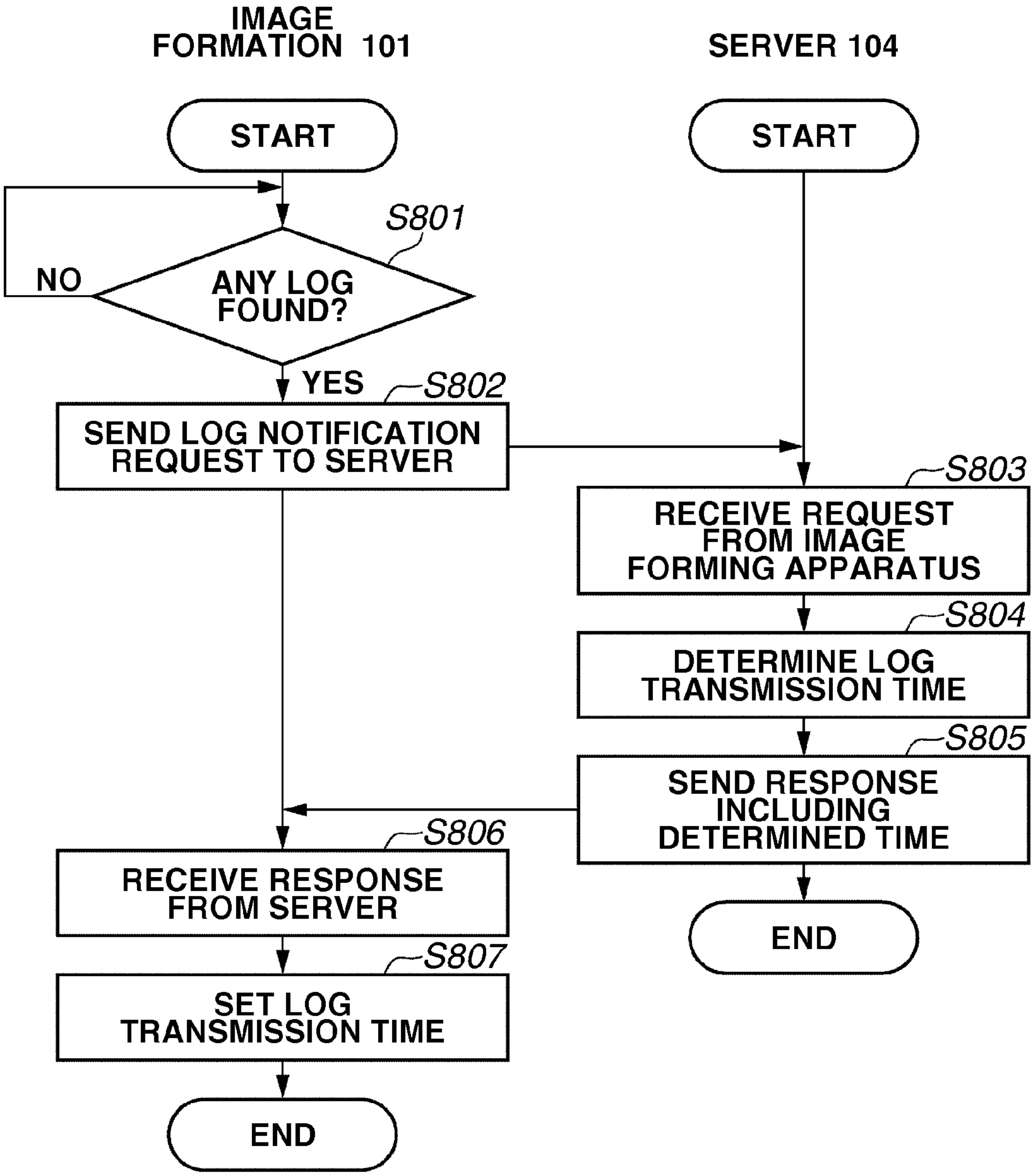
FIG. 8 is a flowchart illustrating a process to be performed by each of the image forming apparatus and the server when a log notification is transmitted.

FIG. 8 is a flowchart illustrating a process to be performed by each of the image forming apparatus 101 and the server 104 when a log notification is transmitted. A program for the process to be performed by the image forming apparatus 101 according to the present flow illustrated in FIG. 8 is stored in the HDD 211 thereof. This program is read out to the RAM 202 and executed by the CPU 201. A program for the process to be performed by the server 104 according to the present flow illustrated in FIG. 8 is stored in the HDD 312 thereof. This program is read out to the RAM 303 and executed by the CPU 301.

Figure 9:
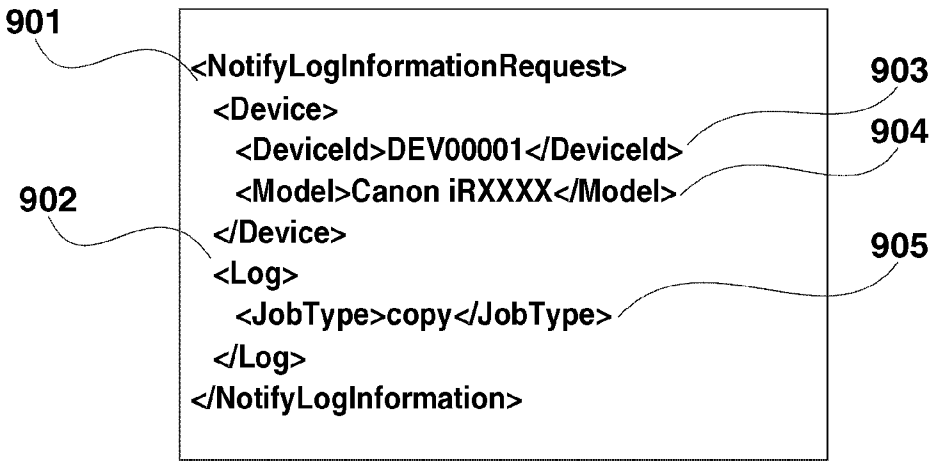
FIG. 9 illustrates an example of a log notification request transmitted by the image forming apparatus.
Figure 10:
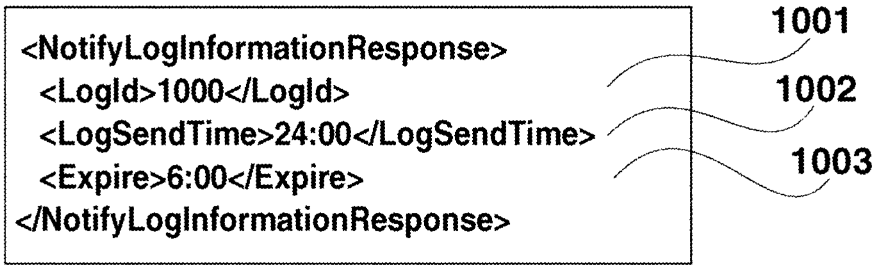
FIG. 10 illustrates an example of a log notification response transmitted by the server.

In step S801, the log notification transmission unit 404 monitors whether there is any log to be newly sent. If there is a log to be newly sent (Yes in step S801), the process proceeds to step S802. In step S802, the log notification transmission unit 404 sends a log notification request to the server 104. FIG. 9 illustrates a log notification request to send. Next, in step S803, the log notification receiving unit 601 receives the log notification request sent in step S802. Then, in step S804, the log transmission time determination unit 602 determines a log transmission time based on the flowchart illustrated in FIG. 13. After that, in step S805, the log notification receiving unit 601 sends to the image forming apparatus 101 a log notification response including the log transmission time determined in step S804. FIG. 10 illustrates the log notification response to send. Next, instep S806, the log notification transmission unit 404 receives the log notification response sent in step S805. Then, in step S807, the log notification transmission unit 404 extracts the log transmission time contained in the received log notification response, and sets the extracted log transmission time in the log transmission unit 405.

FIG. 9 illustrates an example of the log notification request sent by the image forming apparatus 101. The log notification request contains a Device element 901 representing device information of the image forming apparatus 101, and a Log element 902 representing log information. The Device element 901 contains a DeviceId element 903 uniquely identifying the image forming apparatus, and a Model element 904 representing a model name. The Log element 902 contains a JobType element 905. Consequently, a log transmission time can be determined according to device information or log information.

FIG. 10 illustrates an example of a log notification response transmitted by the server 104. The log notification response contains a LogId element 1001 uniquely identifying a log notification request, a LogSendTime element 1002 representing a log transmission time, and an Expire element 1003 representing an expiration date of a log transmission.

Figure 11:
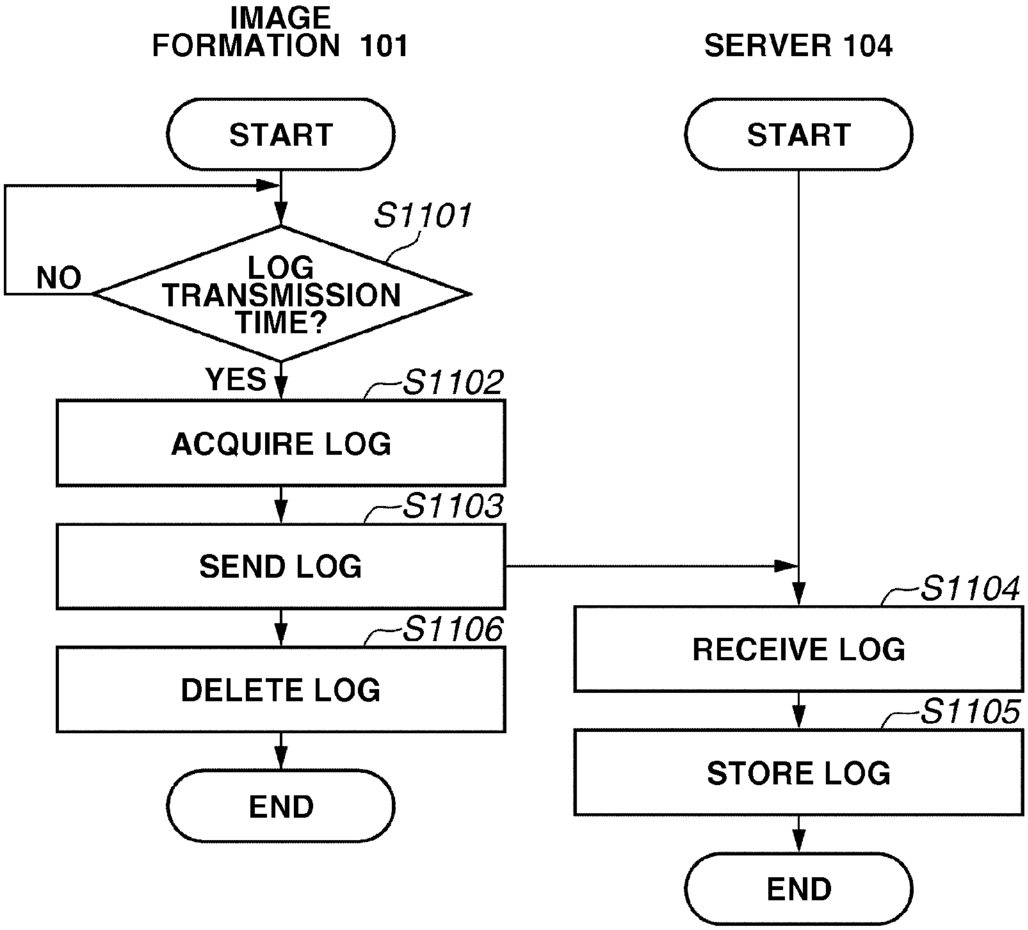
FIG. 11 is a flowchart illustrating a process to be performed by each of the image forming apparatus and the server when a log is transmitted.

FIG. 11 is a flowchart illustrating a process to be performed by each of the image forming apparatus 101 and the server 104 when a log is sent. A program for the process to be performed by the image forming apparatus 101 is stored in the HDD 211 thereof. This program is read out to the RAM 202 and executed by the CPU 201. A program for the process to be performed by the server 104 is stored in the HDD 312 thereof. This program is read out to the RAM 303 and executed by the CPU 301.

In step S1101, the log transmission unit 405 monitors whether a current time is a log transmission time represented by the log transmission time information received from the server 104. If the current time is the log transmission time (Yes in step S1101), the process proceeds to step S1102. In step S1102, the log transmission unit 405 acquires from the log storage unit 403 a job log 501 and an image log 509 as logs to send. Then, in set S1103, the log transmission unit 405 sends the job log and the image log to the server 104. Next, in step S1104, the log receiving unit 604 receives the job log and the image log sent in step S1103. In step S1105, the log receiving unit 604 causes the log storage unit 605 to store the received job log and the received image log. In step S1106, the log transmission unit 405 deletes the sent job log 501 and the sent image log 509 from the log storage unit 403.

FIG. 12 is a diagram illustrating an example of a log transmission schedule table generated by the server 104. A log transmission time 1202 in a log transmission schedule table 1201 is calculated from the log transmission time zone 701 and the log transmission interval 702 set by the log transmission information setting unit 603. A receipt number 1203 is a number assigned to a log notification request by the server 104 when the server 104 receives the log notification request. The receipt number 1203 is returned to the image forming apparatus 101 as a content of the LogId element 1001 identifying a log notification response. A device ID 1204 represents an ID identifying an image forming apparatus and is received as a content of the DeviceId element 903 of a log notification request. When receiving a log notification request from the image forming apparatus 101, the log transmission time determination unit 602 determines a log transmission time and adds the receipt number and the device ID to the log transmission schedule table 1201, as will be described below.

Figure 13:
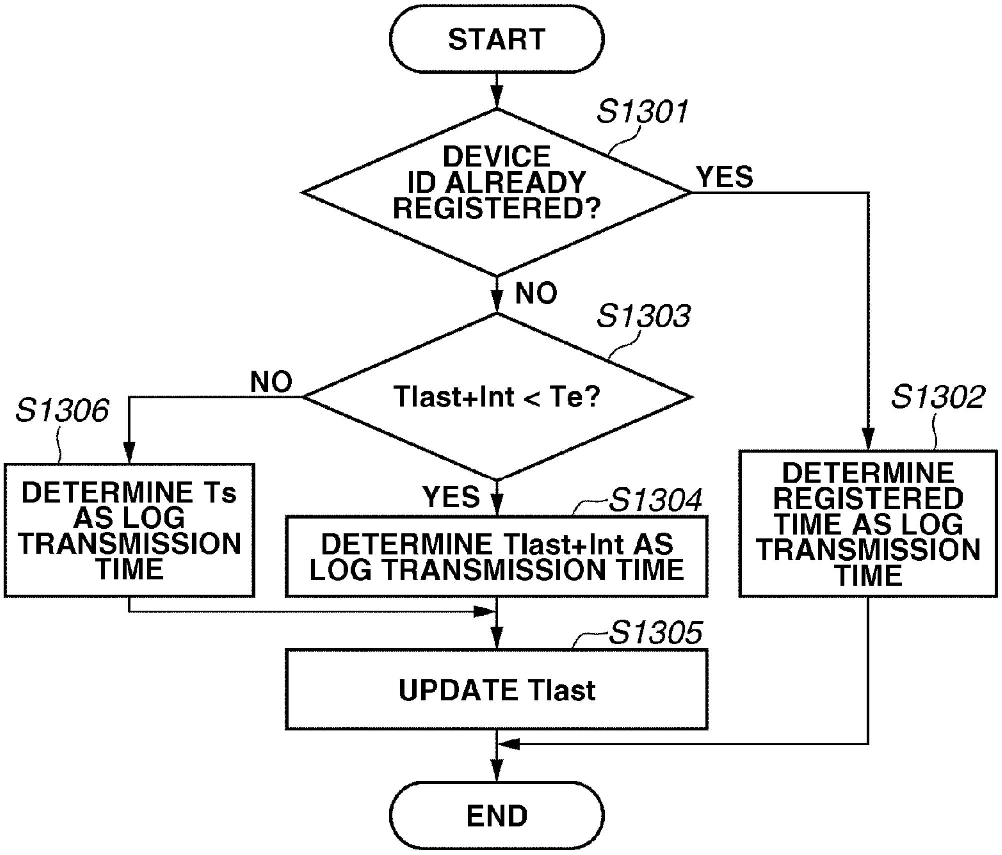
FIG. 13 is a flowchart illustrating a process to be performed when a log transmission time determination unit of the server determines a log transmission time.

FIG. 13 is a flowchart illustrating a process to be performed when a log transmission time determination unit 602 of the server 104 determines a log transmission time. A program for the process to be performed by the log transmission time determination unit 602 according to the present flow is stored in the HDD 312. This program is read out to the RAM 303 and executed by the CPU 301.

In the following description of the present flowchart, a starting time Is and an ending time Te of the log transmission time zone and the scheduling interval Int are used, which are contained in the log transmission information set by the log transmission information setting unit 603, which is illustrated in FIG. 7. In addition, the last log transmission time Tlast contained in the log transmission schedule table 1201 is used in the following description. In a state in which no information is registered in the log transmission schedule table 1201, the last log transmission time Tlast is initialized to Ts.

In step S1301, the log transmission time determination unit 602 determines whether the device ID identifying an image forming apparatus has already been registered in the log transmission schedule table 1201. If the device ID has already been registered therein (Yes in step S1301), the process proceeds to step S1302 in which the log transmission time determination unit 602 determines, as a log transmission time, a time which is the same as the registered log transmission time. If the device ID is not registered therein (N in step S1301), the process proceeds to step S1303 in which the log transmission time determination unit 602 determines whether a time Tlast+Int exceeds Te. If it is found as a result of determination in step S1303 that the time Tlast+Int doesn't exceed Te (N in step S1303), the process proceeds to step S1304 in which the log transmission determination unit 602 determines the time Tlast+Int as a log transmission time. Then, in step S1305, the log transmission time determination unit 602 updates Tlast to the time determined in step S1304. If it is found, as a result of determination in step S1303, that the time Tlast+Int exceeds Te (Yes in step S1303), the process proceeds to step S1306 in which the log transmission time determination unit 602 determines Ts as a log transmission time. Then, in step S1305, the log transmission time determination unit 602 updates Tlast to Ts.

Next, a second exemplary embodiment of the present invention is described hereinafter. According to the first exemplary embodiment, the server 104 determines a log transmission time in a preset log transmission time zone. According to the second exemplary embodiment, the server 104 can not only determine the log transmission time in the preset log transmission time zone but respond by sending, to the image forming apparatus 101, information to permit the image forming apparatus to immediately transmit a log to the server 104. More specifically, the log transmission information setting unit 603 sets conditions for permitting the image forming apparatus to perform immediate transmission of a log. Then, the log transmission time determination unit 602 determines whether the received log notification request meets the set conditions. Consequently, the system is flexibly configured so that, e.g., an image forming apparatus having HDD of small capacity to store logs can immediately perform log transmission without waiting until night. Descriptions of components of the present embodiment, which are the same as those of the first exemplary embodiment, are omitted. Differences between the second exemplary embodiment and the first exemplary embodiment are described in detail hereinafter.

Figure 14:
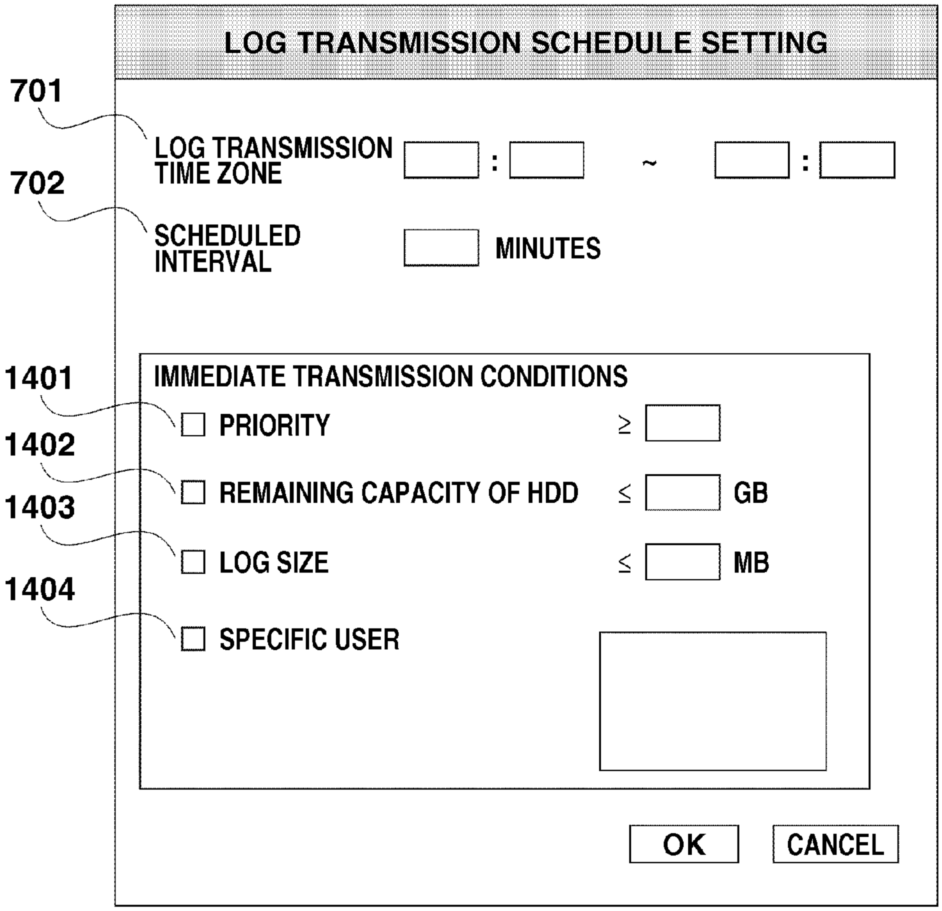
FIG. 14 illustrates an example of a user interface of a log transmission information setting unit of the server.

FIG. 14 illustrates an example of a UI of the log transmission information setting unit 603 of the server 104. The present embodiment uses four conditions 1401 through 1404 as conditions for the server 104 to permit the image forming apparatus 101 to perform immediate transmission. Each of the conditions 1401 through 1404 is enabled or disabled by checking or un-checking an associated check box. The condition 1401 relates to a priority of a log. The priority is defined to have three levels 1, 2, and 3 (1 is the highest level). A log notification request sent from each image forming apparatus contains the priority. Usually, the priority is 2. If a value of 1 is contained in a log notification request as the priority thereof by setting a condition "being equal to or higher than 1" as the condition 1401, an associated log can immediately be transmitted. The condition 1402 relates to current remaining capacity of the HDD of an image forming apparatus. Each log notification request sent from an image forming apparatus contains the current remaining capacity of a HDD thereof. If specific capacity is set as the condition 1402, the server 104 can instruct an image forming apparatus having a HDD of the remaining capacity less than the specific capacity to perform immediate transmission of a log. The condition 1403 relates to a log size. Each log notification request sent from an image forming apparatus contains information concerning a size of a log to send. If a specific size is set as the condition 1403, the server 104 can instruct an image forming apparatus to perform immediate transmission of a log whose size is less than the specific size. The condition 1404 relates to a name of a user who executes a job causing generation of a log. Each log notification request sent from an image forming apparatus contains information concerning a name of a user executing a job. If a specific user name is set as the condition 1404, the server 104 can causes an image forming apparatus to perform immediate transmission of a log corresponding to a job performed by a user having the specific user name. A plurality of user names can be set in the condition 1404.

Figure 15:
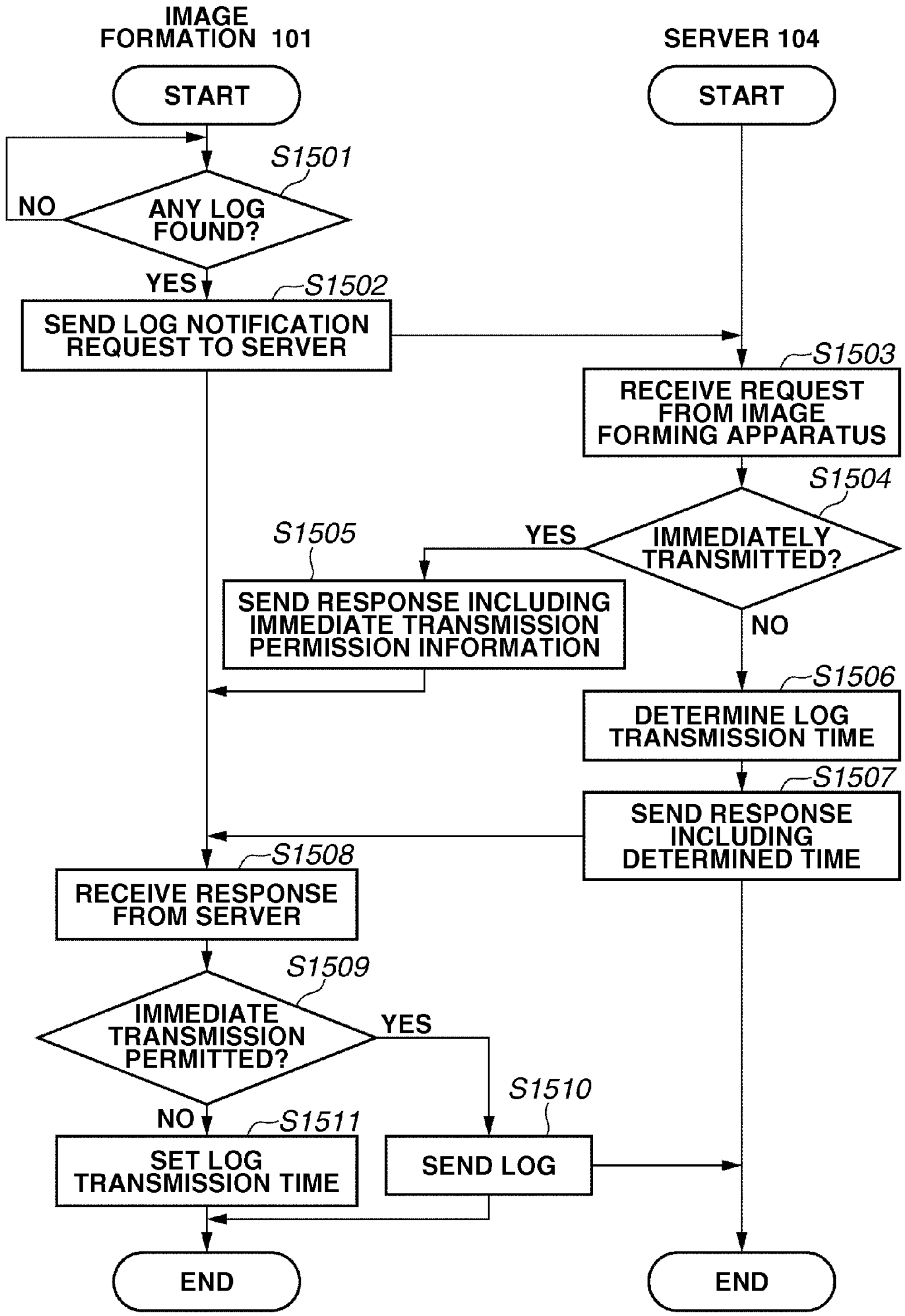
FIG. 15 is a flowchart illustrating a process to be performed by each of the image forming apparatus and the server when a log notification is transmitted.

FIG. 15 is a flowchart illustrating a process to be performed by each of the image forming apparatus 101 and the server 104 when a log notification is transmitted. A program for the process to be performed by the image forming apparatus 101 according to the present flow is stored in the HDD 211 of the image forming apparatus 101. This program is read out to the RAM 202 and executed by the CPU 201. A program for the process to be performed by the server 104 according to the present flow is stored in the HDD 312 of the server 104. This program is read out to the RAM 303 and executed by the CPU 301.

In step S1501, the log notification transmission unit 404 monitors whether there is any log to newly be sent. If there is a log to newly be sent (Yes in step S1501), the process proceeds to step S1502. In step S1502, the log notification transmission unit 404 sends to the server 104 a log notification request as illustrated in FIG. 16. Next, in step S1503, the log notification receiving unit 601 receives the log notification request sent in step S1502. Then, in step S1504, the log transmission time determination unit 602 determines, based on a flowchart illustrated in FIG. 18, whether the image forming apparatus 100 is caused to perform immediate transmission of a log. If the log transmission time determination unit 602 determines that the image forming apparatus 100 is caused to perform immediate transmission of a log (Yes in step S1504), the process proceeds to step S1505 in which the log notification receiving unit 601 sends to the image forming apparatus 101 a log notification response as illustrated in FIG. 17A, which contains log transmission permission information. If the log transmission time determination unit 602 determines that the image forming apparatus 100 is not caused to perform immediate transmission of a log (N in step S1504), the process proceeds to step S1506 in which the log transmission time determination unit 602 determines a log transmission time based on the flowchart illustrated in FIG. 13. Then, in step S1507, the log notification receiving unit 601 sends to the image forming apparatus 101 a log notification response including the log transmission time determined in step S1506. FIG. 17B illustrates the log notification response to be sent. Next, in step S1508, the log notification transmission unit 404 receives the log notification response sent in step S1505 or S1507. Then, in step S1509, the log notification transmission unit 404 determines whether the log notification response contains information for permitting immediate transmission of a log. If the log notification transmission unit 404 determines that the log notification response includes information for permitting immediate transmission of a log (Yes in step S1509), the process proceeds to step S1510 in which the log transmission unit 405 sends a log to the server 104 as described in detail with reference to the flowchart illustrated in FIG. 11. On the other hand, if the log notification transmission unit 404 determines that the log notification response doesn't include information for permitting immediate transmission of a log (N in step S1509), in step S1511, the log notification transmission unit 404 extracts the log transmission time contained in the received log notification response, and sets the extracted log transmission time in the log transmission unit 405.

FIG. 16 is a diagram illustrating an example of a log notification request transmitted by the image forming apparatus 101. According to the present embodiment, among various types of information included in the log notification response sent by the image forming apparatus 101, information such as a content of an element 1601 concerning the image forming apparatus 101 is combined with information such as contents of elements 1602 through 1604 concerning a log itself. According to such a combination of information, it is determined whether the immediate transmission of a log is permitted. The HddLeft element 1601 representing the remaining capacity of a HDD affects the condition 1402. The User element 1602 representing a user name affects the condition 1404. The Priority element 1603 representing a priority affects the condition 1401. The Size element 1604 represents the condition 1403.

FIGS. 17A and 17B respectively illustrate examples of a log notification response sent by the server 104. A content of a SendNow element 1701 representing the permission of immediate transmission of a log takes a value of "true" or "false". The value "true" of the content of the SendNow element 1701 means that immediate transmission of a log is permitted.

Figure 18:
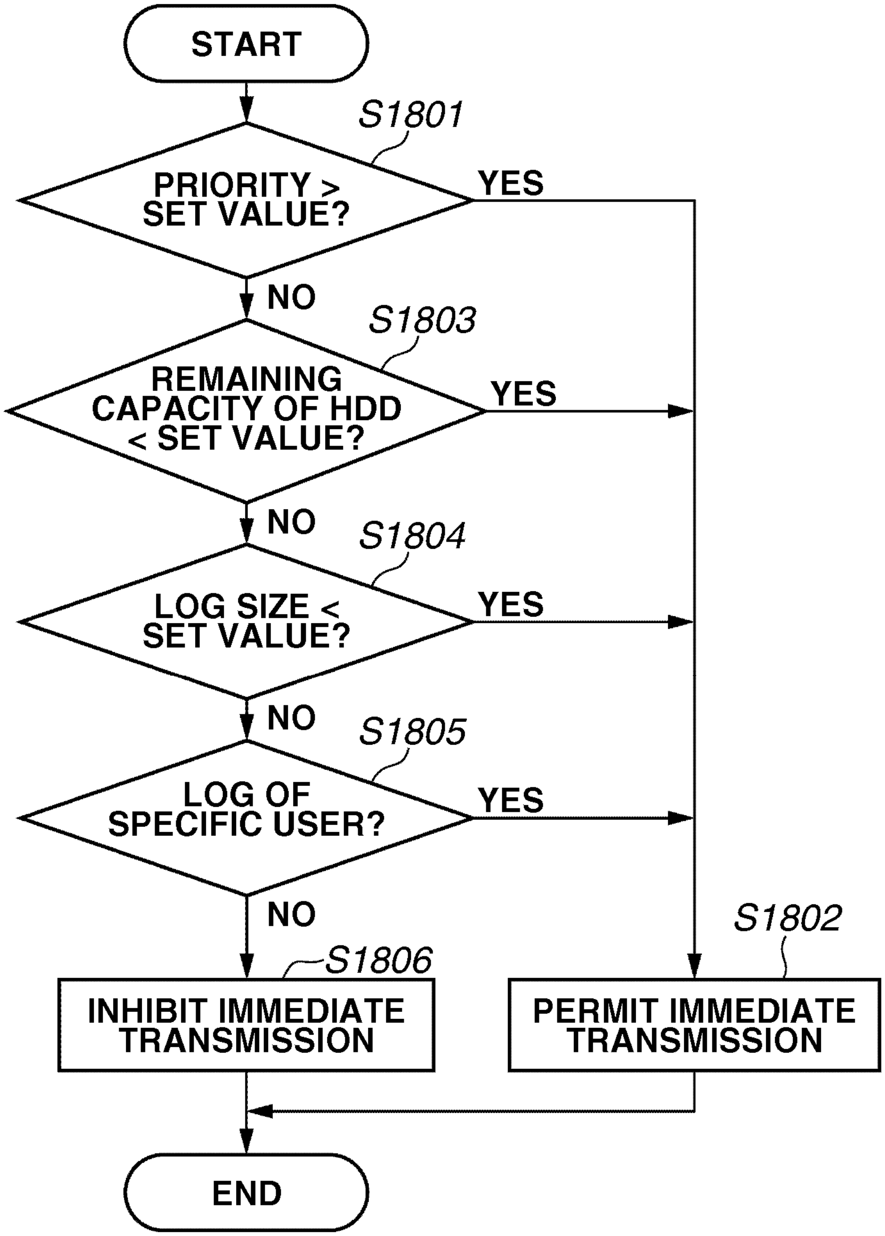
FIG. 18 is a flowchart illustrating a process to be performed when the log transmission time determination unit of the server determines whether immediate transmission of a log is permitted.

FIG. 18 is a flowchart illustrating a process to be performed when the log transmission time determination unit 602 of the server 104 determines whether immediate transmission of a log is permitted. A program for the process to be performed by the log transmission determination unit 602 according to the present flow is stored in the HDD 312 of the server 104. This program is read out to the RAM 303 and executed by the CPU 31.

In step S1801, the log transmission time determination unit 602 determines whether the priority contained in the received log notification request is higher than a value set according to the condition 1401. If the priority is higher than the set value (Yes in step S1801), the process proceeds to step S1802 in which the log transmission time determination unit 602 permits the immediate transmission of a log. If the log transmission time determination unit 602 determines that the priority is not higher than the set value (N in step S1801), the process proceeds to step S1803. In step S1803, the log transmission time determination unit 602 determines whether the remaining capacity of the HDD of the image forming apparatus 101 is less than a value set according to the condition 1402. If the log transmission time determination unit 602 determines that the remaining capacity of the HDD of the image forming apparatus 101 is less than the set value (Yes in step S1803), the process proceeds to step S1802 in which the log transmission time determination unit 602 permits the immediate transmission of a log. If the log transmission time determination unit 602 determines that the remaining capacity of the HDD of the image forming apparatus 101 is not less than the set value (No in step S1803), the process proceeds to step S1804. In step S1804, the log transmission time determination unit 602 determines whether the log size represented by information contained in the received log notification request is less than a value set according to the condition 1403. If the log transmission time determination unit 602 determines that the log size is less than the set value (Yes instep S1804), the process proceeds to step S1802 in which the log transmission time determination unit 602 permits the immediate transmission of a log. If the log transmission time determination unit 602 determines that the log size is not less than the set value (No in step S1804), the process proceeds to step S1805. In step S1805, the log transmission time determination unit 602 determines whether a user name represented by information contained in the received log notification request is included by the user name set according to the condition 1404. If the log transmission time determination unit 602 determines that a user name represented by information contained in the received log notification request is included by the set user name (Yes in step S1805), the process proceeds to step S1802 in which the log transmission time determination unit 602 permits the immediate transmission of a log. If the log transmission time determination unit 602 determines that a user name represented by information contained in the received log notification request is not included by the set user name (No in step S1805), the process proceeds to step S1806. In step S1806, the log transmission determination unit 602 inhibits the immediate transmission of a log.

Next, a third exemplary embodiment of the present invention is described hereinafter. According to the first exemplary embodiment and the second exemplary embodiment, if the entire log transmission time zone is used by dividing, when the server 104 determines a log transmission time, a log transmission time zone by a transmission interval, the server 104 returns to a starting time of the log transmission time zone and determines a log transmission time again. According to the third exemplary embodiment, when the server 104 uses the entre log transmission time zone, a log transmission time is determined such that total power consumption at each log transmission time is dispersed. Usually, the log transmission time zone is set in a night-time in which users don't use the image forming apparatuses. When users don't use the image forming apparatuses, the image forming apparatuses are put into an electric-power saving state and operate so as to suppress power consumption. However, at each log transmission time, the image forming apparatus returns from the electric-power saving state and ordinarily consumes electric power to perform log transmission processing. Even if log transmission times are dispersed in the log transmission time zone, many image forming apparatuses perform log transmission at each log transmission time when the number of the image forming apparatuses increases. Then, if the image forming apparatuses consuming high power intensively perform log transmission at a specific time, the power consumption of the entire system increases. Thus, with the configuration according to the present embodiment, log transmission scheduling is performed to prevent the image forming apparatuses consuming high power from intensively performing log transmission. Accordingly, the power consumption of the entire system can be suppressed. Descriptions of components of the present embodiment, which are the same as those of the first exemplary embodiment and the second exemplary embodiment, are omitted below. Differences of the third exemplary embodiment from the first exemplary embodiment and the second exemplary embodiment are described in detail.

FIG. 19 is a diagram illustrating an example of a log notification request transmitted by the image forming apparatus 101. A Power element 1901 represents the power consumption of the image forming apparatus 101 in a normal state.

FIG. 20 is a diagram illustrating an example of the log transmission schedule table generated by the server 104. Total power consumption 2002 at each log transmission time described in the log transmission schedule table 2001 is information representing power consumption calculated as a sum of electric-power consumption values of the image forming apparatuses each performing log transmission at each of the log transmission times.

Figure 21:
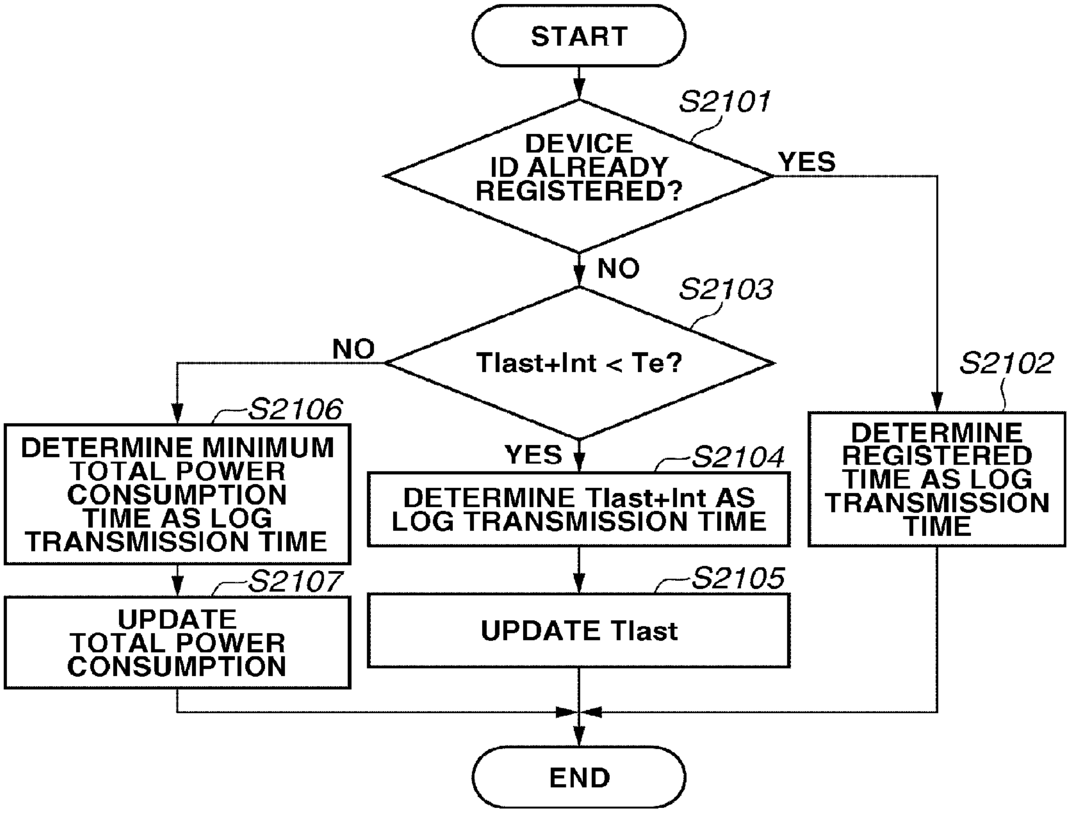
FIG. 21 is a flowchart illustrating a process to be performed when the log transmission time determination unit of the server determines a log transmission time.

FIG. 21 is a flowchart illustrating a process to be performed when the log transmission time determination unit 602 of the server 104 determines a log transmission time. A program for the process to be performed by the log transmission time determination unit 602 according to the present flow is stored in the HDD 312 of the serer 104, and read out to the RAM 303 and executed by the CPU 301.

Processing to be performed in steps S2101 through S2105 is the same as that to be performed insteps S1301 through S1305 of a flowchart illustrated in FIG. 13 in the first exemplary embodiment. Thus, description of processing to be performed in steps S2101 through S2105 is omitted. If it is found as a result of determination in step S2103 that Tlast+Int≥Te (No in step S2103), this result means that the entire log transmission time zone is used. Then, the process proceeds to step S2106. In step S2106, the log transmission time determination unit 602 determines, as a log transmission time, one of the determined log transmission times, at which the total power consumption is minimum. After that, in step S2107, the log transmission time determination unit 602 updates the log transmission schedule table by adding the power consumption represented by the content of the Power element 1901 contained in the log notification request to the total power consumption at the log transmission time determined in step S2106.

Next, a fourth exemplary embodiment of the present invention is described hereinafter. According to the first exemplary embodiment and the second exemplary embodiment, if the entire log transmission time zone is used by dividing, when the server 104 determines a log transmission time, the log transmission time zone by a transmission interval, the server 104 returns to a transmission start time and determines a log transmission time again. According to the fourth exemplary embodiment, when the server 104 uses the entire log transmission time zone, a log transmission time is determined such that a total size of logs to be sent by image forming apparatuses at each log transmission time is dispersed. However, even if log transmission times are dispersed in the log transmission time zone, many image forming apparatuses perform log transmission at each log transmission time when the number of the image forming apparatuses increases. Then, if the image forming apparatuses consuming high power intensively perform log transmission at a specific time, a load imposed on the server at the specific time becomes temporarily high. Thus, performance of log transmission is reduced. Then, with the configuration of the present embodiment, log transmission scheduling is performed to prevent the image forming apparatuses from intensively performing transmission of a large-size log at the specific time. Accordingly, the load imposed on the server 104 can be alleviated. In addition, logs can efficiently be transmitted. In what follows, descriptions of components of the present embodiment, which are the same as those of the first exemplary embodiment and the second exemplary embodiment, are omitted. Differences of the fourth exemplary embodiment from the first exemplary embodiment and the second exemplary embodiment are described in detail.

FIG. 22 is a diagram illustrating an example of the log notification request transmitted by the image forming apparatus 101. A content of a LogSize element 2201 represents a log size.

FIG. 23 is a diagram illustrating an example of the log transmission schedule table generated by the server 104. A total transmission log size 2302 in a log transmission schedule table 2301 is calculated as a sum of sizes of logs to be transmitted by the image forming apparatuses at each log transmission time.

Figure 24:
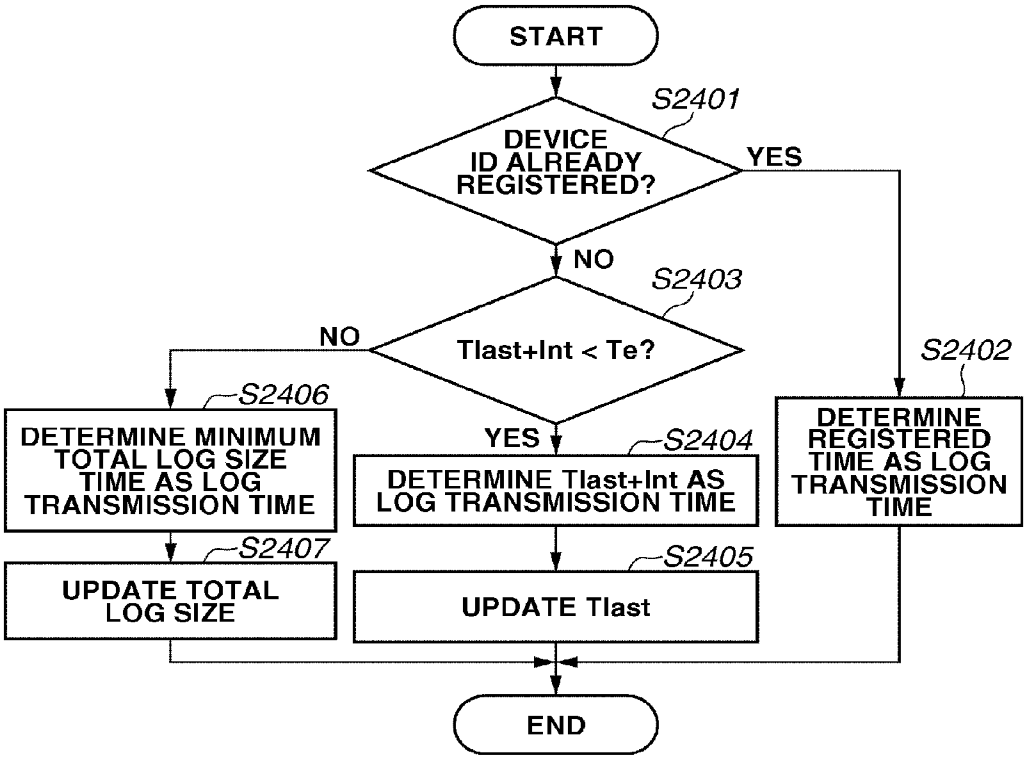
FIG. 24 is a flowchart illustrating a process to be performed when the log transmission time determination unit of the server determines a log transmission time.

FIG. 24 is a flowchart illustrating a process to be performed when the log transmission time determination unit 602 of the server 104 determines a log transmission time. A program for the process to be performed by the log transmission time determination unit 602 according to the present flow is stored in the HDD 312 of the server 104 and read out to the RAM 303 and executed by the CPU 301.

Processing to be performed in steps S2401 through S2405 is the same as that to be performed insteps S1301 through S1305 of the flowchart illustrated in FIG. 13 according to the first exemplary embodiment. Thus, description of processing to be performed in steps S2401 through S2405 is omitted. If it is found as a result of determination in step S2403 that Tlast+Int≥Te (No in step S2403), this result means that the entire log transmission time zone is used. Then, the process proceeds to step S2406. In step S2406, the log transmission time determination unit 602 determines, as an additional log transmission time, one of the determined log transmission times, at which the total log size is minimized. After that, in step S2407, the log transmission time determination unit 602 updates the log transmission schedule table by adding the log size represented by the content of the LogSize element 2201 contained in the log notification request to the total log size at the log transmission time determined in step S2406.

Other Exemplary Embodiments

Exemplary embodiments of the present invention can be implemented as a system, an apparatus, a method, a program, a storage medium, or the like. More specifically, the present invention can be applied to a system configured by a plurality of devices. Alternatively, the present invention can be applied to an apparatus configured by a single unit.

The object of the present invention can be accomplished by executing the following processing, i.e., supplying a system or an apparatus with a storage medium in which a software program code implementing functions of the above exemplary embodiments is stored, and causing a computer (or CPU or microprocessor unit (MPU)) of the system or apparatus to read out and execute the program code stored in the storage medium. In this case, the program code itself read from the storage medium implements the functions of the above embodiment. The program code and the storage medium storing the program code configure the present invention.

The present invention is not limited to above exemplary embodiments. Various modifications and applications can be made within the scope of claims.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-288465 filed Dec. 18, 2009, which is hereby incorporated by reference herein in its entirety.

What is claimed is:

1. A log information management system including a plurality of image forming apparatuses for transmitting, via a network, a plurality of logs stored therein, and an information processing apparatus for receiving the logs from the plurality of image forming apparatuses and managing the received logs, wherein each image forming apparatus comprises at least one processor, functioning as:

a log notification transmitting unit configured to notify the information processing apparatus that the image forming apparatus stores a log, wherein the log notification further includes power consumption information representing electric-power consumption of the image forming apparatus;

a setting unit configured to set a log transmission time extracted from a response received from the information processing apparatus in response to the log notification; and a log transmission unit configured to transmit the log to the information processing apparatus at the set log transmission time, and wherein the information processing apparatus comprises at least one processor functioning as:

a log notification receiving unit configured to receive the log notification from the image forming apparatus;

a log transmission time determination unit configured to determine the log transmission time at which the image forming apparatus transmits the log; and a response unit configured to transmit, to the image forming apparatus, the response including the log transmission time determined by the log transmission time determination unit, wherein the log transmission time determination unit determines the log transmission time according to power consumption information included in the log notification received from the image forming apparatus so that a total amount of power consumption of one or more image forming apparatuses that transmit each log during the same time period is minimized.

2. The log information management system according to claim 1, further comprising a log transmission information setting unit configured to set a log transmission time zone in which the image forming apparatus can transmit the log.

3. The log information management system according to claim 1, wherein the image forming apparatus comprises a determination unit configured to determine from the received response whether immediate log transmission is permitted, wherein the log transmission unit in the image forming apparatus immediately transmits a log when the immediate log transmission is permitted, and wherein the log transmission time determination unit in the information processing apparatus determines whether immediate transmission of the log is performed, and the response includes an immediate transmission instruction.

4. The log information management system according to claim 1, wherein the log transmission time determination unit determines the log transmission time according to log size information included in the log notification received from the image forming apparatus, the log size information representing a size of a log.

5. A control method for a log information management system including a plurality of image forming apparatuses for transmitting a plurality of logs stored therein via a network, and an information processing apparatus for receiving the logs from the plurality of image forming apparatuses and for managing the received logs, wherein each image forming apparatus performs, via at least one processor, log notification transmission by:

sending, to the information processing apparatus, a log notification that the image forming apparatus stores a log, wherein the log notification further includes power consumption information representing electric-power consumption of the image forming apparatus, setting a log transmission time, extracting the log transmission time from a response received from the information processing apparatus in response to the log notification, and transmitting the log to the log information processing apparatus at the set log transmission time, and wherein the information processing apparatus performs, via at least one processor, log notification reception by:

receiving the log notification from the image forming apparatus, determining the log transmission time at which the image forming apparatus transmits the log, transmitting, to the image forming apparatus, the response including the log transmission time at which the image forming apparatus transmits the log, and determining the log transmission time according to power consumption information included in the log notification received from the image forming apparatus so that a total amount of power consumption of one or more image forming apparatuses that transmit each log during the same time period is minimized.

6. An information processing apparatus for receiving a plurality of logs from an image forming apparatus and managing the received logs, the information processing apparatus comprising at least one processor functioning as:

a log notification receiving unit configured to receive a log notification from the image forming apparatus, wherein the log notification includes power consumption information representing electric-power consumption of the image forming apparatus;

a log transmission time determination unit configured to determine a log transmission time at which the image forming apparatus transmits a log; and a response unit configured to transmit, to the image forming apparatus, a response including the log transmission time determined by the log transmission time determination unit, wherein the log transmission time determination unit determines the log transmission time according to power consumption information included in the log notification received from the image forming apparatus.

7. A method for receiving a plurality of logs from an image forming apparatus and managing the received logs, the method comprising:

receiving a log notification from the image forming apparatus, wherein the log notification includes power consumption information representing electric-power consumption of the image forming apparatus;

determining a log transmission time at which the image forming apparatus transmits a log;

transmitting, to the image forming apparatus, a response including the log transmission time at which the image forming apparatus transmits the log; and determining the log transmission time according to power consumption information included in the log notification received from the image forming apparatus, wherein the log transmission time is determined according to power consumption information included in the log notification received from the image forming apparatus.

8. A non-transitory computer-readable storage medium on which is stored a computer-executable program for causing a computer to perform a method for receiving a plurality of logs from an image forming apparatus and managing the received logs, the method comprising:

receiving a log notification from the image forming apparatus, wherein the log notification includes power consumption information representing electric-power consumption of the image forming apparatus;

determining a log transmission time at which the image forming apparatus transmits a log;

transmitting, to the image forming apparatus, a response including the log transmission time at which the image forming apparatus transmits a log; and determining the log transmission time according to power consumption information included in the log notification received from the image forming apparatus, wherein the log transmission time is determined according to power consumption information included in the log notification received from the image forming apparatus.

* * * * *